April 1, 1924.

A. H. PAPE 1,488,827

SLIDING SIDE WINDOW FOR AUTOMOBILES

Filed June 8, 1920    2 Sheets-Sheet 1

INVENTOR
A. H. PAPE.

ATT'YS.

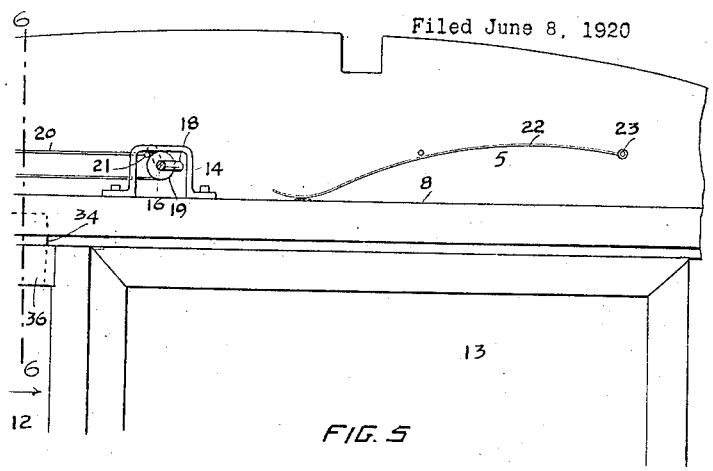
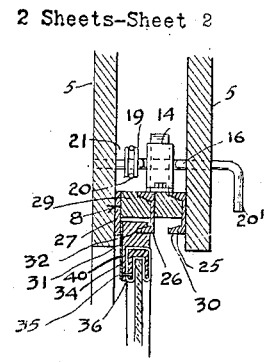
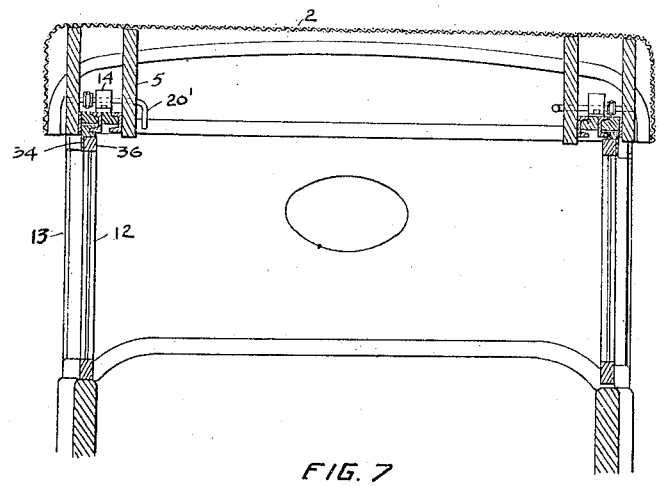
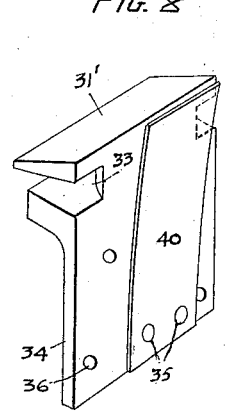
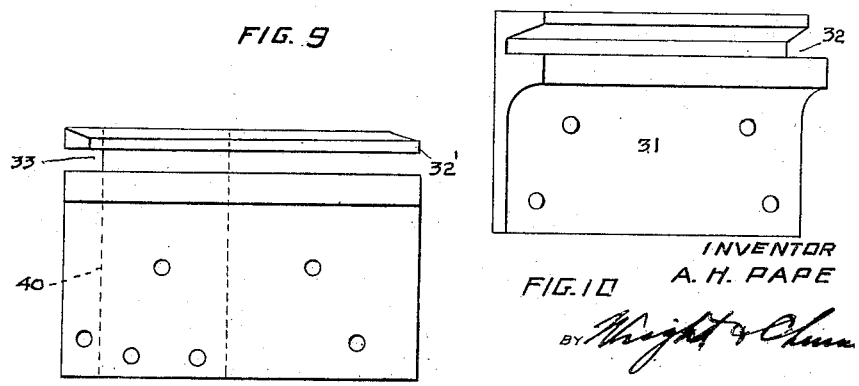
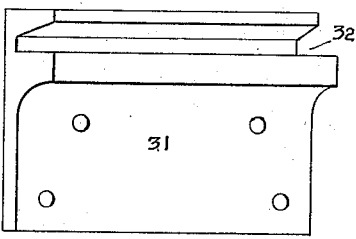

Patented Apr. 1, 1924.

1,488,827

UNITED STATES PATENT OFFICE.

AUGUST H. PAPE, OF KENTFIELD, CALIFORNIA.

SLIDING SIDE WINDOW FOR AUTOMOBILES.

Application filed June 3, 1920. Serial No. 387,369.

*To all whom it may concern:*

Be it known that I, AUGUST H. PAPE, a citizen of the United States, residing at Kentfield, in the county of Marin and State of California, have invented new and useful Improvements in Sliding Side Windows for Automobiles, of which the following is a specification.

This invention relates to improvements in side windows for automobile tops and resides in the provision of side windows which may be readily and easily moved into and out of position to close the open sides of an automobile top and which are constructed so that they can be readily attached to an ordinary automobile top without necessitating any change in the construction of the top.

An object of the invention is to provide novel means for slidably supporting the windows for movement into and out of position between the body of an automobile and the top thereof, said means providing for the disposing of the windows in flush relation to one another at their opposed edges and doing away with the overlapping of the windows at their opposed edges whereby a smooth tight joint having a more uniform finished appearance will be provided.

A further object of the invention is to generally improve side window attachments for automobiles so that the windows will not rattle.

The invention possesses other advantages and features, some of which, with the foregoing, will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form, since the invention as expressed in the claims may be embodied in a plurality of forms.

Figure 5 is an enlarged fragmentary side elevation of the window supporting means taken on the line 6—6 of Figure 5.

Figure 6 is an enlarged fragmentary vertical sectional view of said means.

Figure 7 is a transverse sectional view taken through the upper part of the body and the top of an automobile, showing my invention as applied thereto.

Figure 8 is a perspective view of the shoe for slidably connecting the front of the rear window with the track.

Figure 9 is a front elevation of the shoe for supporting the rear part of the rear window.

Figure 10 is a front elevation of one of the front window shoes.

Fig. 11 is an enlarged fragmentary horizontal sectional view showing two of the windows in withdrawn position and one partly extended.

Figure 1:
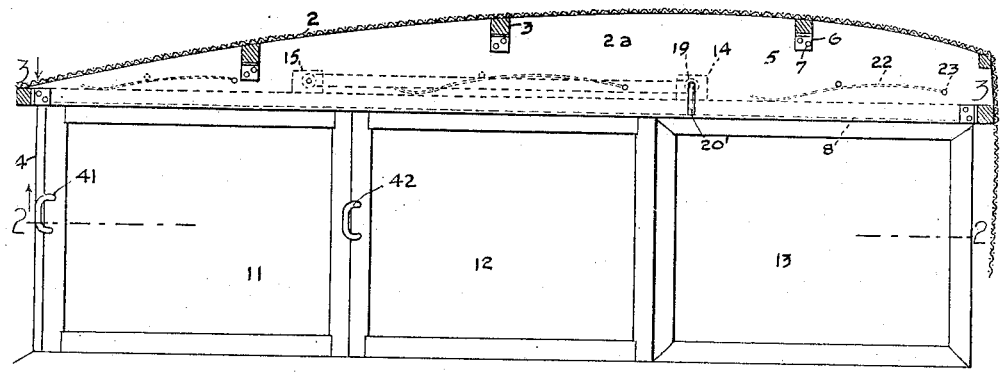
Figure 1 is a sectional view taken through the upper part of an automobile body and top showing my invention as when it will appear in use, in side elevation.
Figure 2:
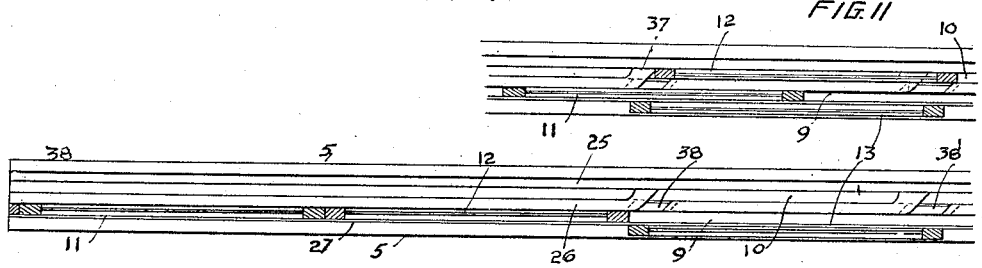
Figure 2 is a longitudinal sectional view taken on the line 2—2 of Figure 1.
Figure 3:
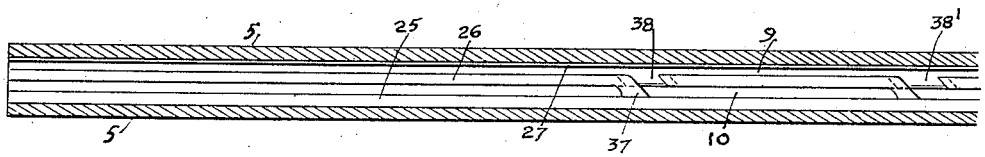
Figure 3 is a similar view taken on the line 3—3 of Figure 1 with the parts in reversed position as shown in Figure 2.
Figure 4:
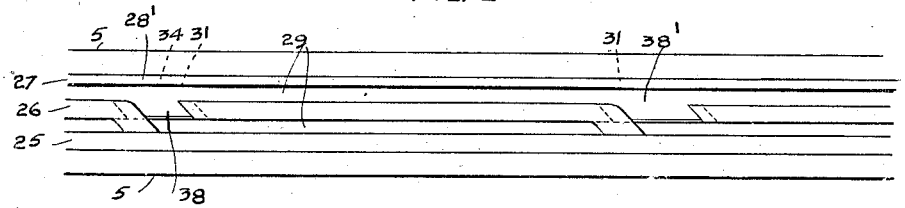
Figure 4 is an enlarged fragmentary top plan view of the track.

Referring particularly to the drawings, 1 designates the body of an automobile having a top 2 of the ordinary construction, said top being supported by the usual bows 3 and connected at its forward end in the customary manner with the wind shield frame 4.

In carrying out my invention, I mount a pair of spaced guide boards 5 in the top 2 on each side thereof, said boards extending for the length of the top and serving as a foundation for the apparatus of the invention. The upper edges of the boards are curved to conform to the curvature of the top, whereas the lower edges are straight and are concealed by the overhanging sides 2ª. Any suitable means, such as angular brackets 6, fastened by screws 7 to the bows 3 and boards 5, may be used to secure the boards to the top.

Vertically movably mounted between each pair of boards 5 is the window supporting means 8, including tracks 9 and 10, which tracks slidably support front and rear windows 11 and 12. The track 9 extends substantially the full length of the top and inside of the stationary windows 13 which latter, are incorporated with the top and body in the customary manner. The windows 11 and 12 when not in use lie one opposite the other inside of the windows 13.

The supporting means 8 on each side of the top is provided with means for adjustably, or vertically movably supporting it in position between the guide boards 5. This means comprises a plurality of angular loops 14 and 15, secured to the means 8 on the upper side thereof at suitably spaced points. Journalled transversely between and in the boards 5 are crank shafts 16 and 17, the crank portions 18 of which being extended through the loops 14. Pulleys 19 are mounted upon the shaft 16 and 17 and between the boards 5. A flexible element 20 in the form of a belt is mounted upon these pulleys so that when one shaft is rotated, the other shaft will be turned. The shaft 16 is extended through the board 5 and has a handle 20' thereon which provides for operation of the shafts so as to raise and lower the window supporting means. When the handle 20' is turned in the proper direction, the shaft 16 rotates so that the crank portion 18 thereof engages the loop 14 and tends to lift up the means 8. By means of the pulleys and belt, the shaft 17 will be rotated and also effect a lifting up action on the supporting means 8. The crank portions of these shafts are moved past center and when in this position engage stop pins 21 mounted between and secured to the boards 5. In this position, the supporting means 8 will be maintained of its own accord in up position so that the windows 11 and 12 at their lower edges will be spaced from the upper edges of the body of the automobile.

There are provided leaf springs 22 secured at certain ends to and between the boards 5 as at 23, and which at their other ends bear upon the supporting means 8. These springs exert a tendency at all times to push downwardly upon the supporting means 8, and also prevent rattling of the windows as they hold the same down under tension. It will thus be seen that when the windows are in out-of-the-way position, and it is desired to raise them, or when they are extended and it is desired to move them into out-of-the-way position, this may be easily accomplished by rotating the shafts 16 and 17 to raise the supporting means 8 whereby the lower edges of the windows are raised from contact with the automobile body.

In order to provide for the disposition of the windows in line and with the opposed ends thereof substantially flush with one another, the tracks 9 and 10 are especially constructed and arranged. The track 9 is outermost and the track 10 extends along the track 9 from the rear end of the track 9 forwardly a distance just a little greater than the length of the rear window. The means 8 which includes the tracks 9 and 10, comprises a pair of channel iron bars 25 and 26, and a flat metal bar 27, secured in spaced relation to one another, there being mounted between these bars wooden spacing strips 29. These strips terminate short of the lower edges of the bars, providing spaces above the lower flanges 30 of the bars 25 and 26. These flanges serve as the tracks upon which the means for slidably connecting the windows with the tracks ride. This latter means comprises for the front window shoes 31 having transverse side opening grooves 32, which grooves receive and ride upon the flanges 30 of the tracks, as shown in Figure 6 of the drawings. For the rear window there are provided similar shoes 31' and 32', the ends of which are transversely grooved, as at 33, for a purpose to be later more fully described. Depending from the blocks are flanges or lugs 34 which are secured by suitable fastening elements 35 to the frame 36 of the windows 11 and 12, said flanges being secured adjacent to the vertical edges of said window frames.

The window 11, being the front window, slides only upon the track 9, whereas the window 12 slides in part upon the track 10, but is movable transversely into and slides mostly upon the track 9, so as to bring its front vertical edge into alinement with the rear vertical edge of the window 11. There is provided a stop member 37 in the track 10 to limit the movement of the window 12 in its outward extension. The flanges 30 of the track 10 and a part of the body of the bar 26 of which said track is formed are cut away to provide channels or openings 38 and 38' communicating the tracks with each other at the end of the track 10, said openings being undercut and the opposed edges of the flanges where cut are identically angularly inclined or bevelled, as at 28' so that the openings lead forwardly and outwardly angularly from the track 10 into the track 9. The shoes 31' and 32' in having the grooves 33 transversely cut therein at their ends and longitudinally thereof are capable of being readily moved from one track to the other and in so doing, will not move from engagement with the flanges owing to the fact that the opening 38 is undercut and the edges of the flanges 30 extend in the grooves 33.

Secured at their lower ends to the back of the shoes 31, 31', and 32' are flat leaf springs 40, the upper ends of which terminate at a point adjacent to the upper ends of the shoes. These springs are adapted to engage the sides of the track as shown in Figure 6 of the drawing so as to prevent rattling of the shoes in the tracks. On the rear window 12, these springs 40 serve as a means for automatically moving said rear window out of the track 9 and into the track 10 when said window is moved to a certain point on the track 9. The shoe 31' is of less width than the shoe 32', which latter is disposed at the rear edge of the back window. The openings 38 and 38' in the track 9 are of such size as to accommodate the respective shoes 31' and 32'. The opening or channel 38 is of just sufficient size to permit the shoes 31' to pass therethrough but not large enough to accommodate the shoe 32'. Both shoes of the front window are larger, that is, wider than either of the channels or openings.

To extend the windows, assuming that they are supported in up position, one behind the other, inside of the stationary windows 13, the front window 11 is grasped by the handle 41 and pulled into forward position on the track 9. As soon as the rear edge of the front window has been moved past the opening 38 communicating the tracks 9 and 10, the handle 42 of the rear window 12 may be grasped and said window pulled forward. In attempting to pull the window forwardly, shoes 31 and 32' come into contact with the inclined ends 38 and 38' of each opening therefor and said window moves outwardly and angularly from the track 10 onto the track 9. Both windows may then be moved on the track 9 into extended position so that their opposed longitudinal edges aline and abut one another. This disposes the window in line, does away with overlapping of the windows, at their opposed ends, and makes a smooth neat joint. After the windows have been moved into their extended position, the crank 20' is turned so that the raising and lowering mechanism is operated to lower the supporting means 8. When the supporting means 8 is lowered, the springs 22 press downwardly upon said means and cause the lower edge of the windows to bear yieldingly and closely upon the upper edge of the body of the automobile. The windows are thus securely held in extended position and by reason of the springs 22 and 40 are prevented from rattling.

To move the windows to out-of-the-way position, the handle 20' is turned so as to raise said supporting means 8 and likewise raise the lower edges of the windows from contact with the body of the automobile. The rear window 12 is then moved rearwardly and as the shoe 32' thereof is larger than the first opening 38, said shoe passes by said opening. When the shoes 31' and 32' register with the respective channels or openings 38 and 38', the springs 40 on said shoes quickly force the window into the track 10, that is, said springs force the shoes into the channels 38 and 38' into the track, causing the window to follow in this movement. It will thus be seen that the rear window will automatically move into the track 10 when brought into a certain position on the track 9. With the rear window disposed in the track 10, the front window is then moved to its rearmost position on the track 9.

I claim:—

1. The combination with an automobile body and a top therefor, of window tracks mounted in the top on opposite sides thereof, there being a pair of tracks on each side of said top, windows slidably suspended from the tracks and adapted to engage the upper edge of the body and means providing for sliding a window laterally from one track onto the other track of each pair, and means for vertically movably supporting the tracks in said top.

2. The combination with an automobile body and a top therefor, of window tracks mounted so as to move up and down in the top on opposite sides thereof, there being a pair of tracks on each side of said top, windows slidable upon said tracks and adapted to engage the upper edge of the body of the automobile, means providing for movement of a window from one track on to the other track of each pair and means for moving said tracks up and down relative to the top.

3. The combination with an automobile body and a top therefor, of a pair of window tracks mounted in the top on each side thereof, said tracks being parallel and provided with intercommunicating passages, windows movable longitudinally between the top and body, and means for slidably connecting each window with a track, the means for one window being movable from one track to the other through said passage, spring means for forcing said tracks bodily in one direction, and means for moving said tracks in the other direction against the action of said spring means.

4. An automobile top embodying in its construction guide means extending longitudinally and upon opposite sides of the top, window tracks movable up and down in said guide means, windows slidably mounted upon said tracks, a bracket fastened to said track, a crank shaft extending transversely between and above the track and having its crank portion disposed within said bracket and arranged to engage said bracket and lift the track when the shaft is turned, and means providing for maintaining the track raised when said shaft is moved to a predetermined point.

5. The combination with an automobile top, of a window track supported by the top, shoes slidable upon said track, windows supported by said shoes, a second track on to which certain of said shoes are movable when one of the windows is brought to a predetermined position on the first-named track, and spring means carried by certain of the shoes and interposed between opposite faces of the shoes and first track, and which automatically moves certain of said shoes laterally from the first track on to the second track when said window is brought to said predetermined position.

6. In combination with an automobile body and top therefor, of a track extending longitudinally of the top on each side thereof, a plurality of windows suspended upon said track and movable longitudinally thereon, another track mounted longitudinally on each side the top rearwardly and to one side of the first named track, shoes slidable upon the tracks with which said windows are connected, said tracks on each side having connecting passages and means carried by the shoes for one of the said windows which means causes said window to move from the first named track onto the second named track on each side when the shoes for said window are brought opposite said connecting passages.

7. The combination with automobile body and top elements, of a guide supported by the top element, a presser bar movable up and down with relation to the guide, windows slidable longitudinally between the presser bar and body, window tracks operatively associated with the top, means for slidably connecting each window with a track, the means for one window being movable from one track to the other, said tracks having intercommunicating passages therebetween on each side of the automobile and means for depressing the presser bar and applying a holding pressure to the windows.

AUGUST H. PAPE.